(12) United States Patent
Wang et al.

(10) Patent No.: US 9,335,588 B2
(45) Date of Patent: May 10, 2016

(54) LIQUID CRYSTAL DISPLAY PANEL

(71) Applicant: Century Technologh (Shenzhen) Corporation Limited, Shenzhen (CN)

(72) Inventors: Ming-Tsung Wang, New Taipei (TW); Chih-Chung Liu, New Taipei (TW); Yi-Hsiu Cheng, New Taipei (TW); Xiao-Qian Wang, Shenzhen (CN)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 0 days.

(21) Appl. No.: 14/243,832

(22) Filed: Apr. 2, 2014

(65) Prior Publication Data

US 2014/0300841 A1    Oct. 9, 2014

(30) Foreign Application Priority Data

Apr. 3, 2013 (CN) .......................... 2013 1 0115290

(51) Int. Cl.
*G02F 1/136* (2006.01)
*G02F 1/1339* (2006.01)
(52) U.S. Cl.
CPC .................................. *G02F 1/13394* (2013.01)
(58) Field of Classification Search
CPC ................................................ G02F 1/13394
USPC ................................................ 349/155–157
See application file for complete search history.

(56) References Cited

U.S. PATENT DOCUMENTS

| 6,437,847 B1 | 8/2002 | Kishimoto | |
|---|---|---|---|
| 8,120,720 B2 * | 2/2012 | Liu et al. | 349/43 |
| 8,345,213 B2 * | 1/2013 | Yoshida | 349/156 |
| 8,958,042 B2 * | 2/2015 | Sonoda et al. | 349/141 |
| 2008/0043165 A1 * | 2/2008 | Kim | 349/46 |
| 2008/0079892 A1 * | 4/2008 | Fujikawa | G02F 1/1362 349/156 |
| 2009/0322996 A1 * | 12/2009 | Dong | 349/106 |
| 2012/0092596 A1 | 4/2012 | Cho et al. | |

FOREIGN PATENT DOCUMENTS

CN         102455556 A       5/2012

* cited by examiner

*Primary Examiner* — Charles Chang
(74) *Attorney, Agent, or Firm* — Novak Druce Connolly Bove + Quigg LLP

(57) ABSTRACT

Liquid crystal display panel includes a first substrate, a second substrate facing the first substrate, a liquid crystal layer sandwiched between the first substrate and the second substrate, a plurality of spacers located in the liquid crystal layer and protruding from the first substrate towards the second substrate, and a plurality of supporters defined at an inner surface of the second substrate and configured to support the spacers. Each supporter is corresponding to one spacer of the plurality of spacers and has a "+" shape or a "Y" shape in a top view.

18 Claims, 5 Drawing Sheets

LIQUID CRYSTAL DISPLAY PANEL

CROSS-REFERENCE TO RELATED APPLICATIONS

This application claims all benefits accruing under 35 U.S.C. §119 from China Patent Application No. 201310115290.X, filed on Apr. 3, 2013 in the China Intellectual Property Office, the content of which is hereby incorporated by reference.

BACKGROUND

1. Field

The present disclosure relates to a liquid crystal display panel.

2. Background

A liquid crystal display panel usually has an upper substrate, a lower substrate, a liquid crystal layer sandwiched between the upper substrate and the lower substrate, and a plurality of spacers are disposed in the liquid crystal layer and configured to make the upper substrate and the lower substrate maintain a proper distance. Generally, the lower substrate has a plurality of driving lines (such as source lines) protruding from the upper substrate towards the lower substrate, and the spacers are positioned corresponding to the driving lines. However, when an external force applied to the liquid crystal display panel, the spacers may move from positions facing the driving lines to sides of the driving lines, this may cause light leakage of the liquid crystal display panel.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
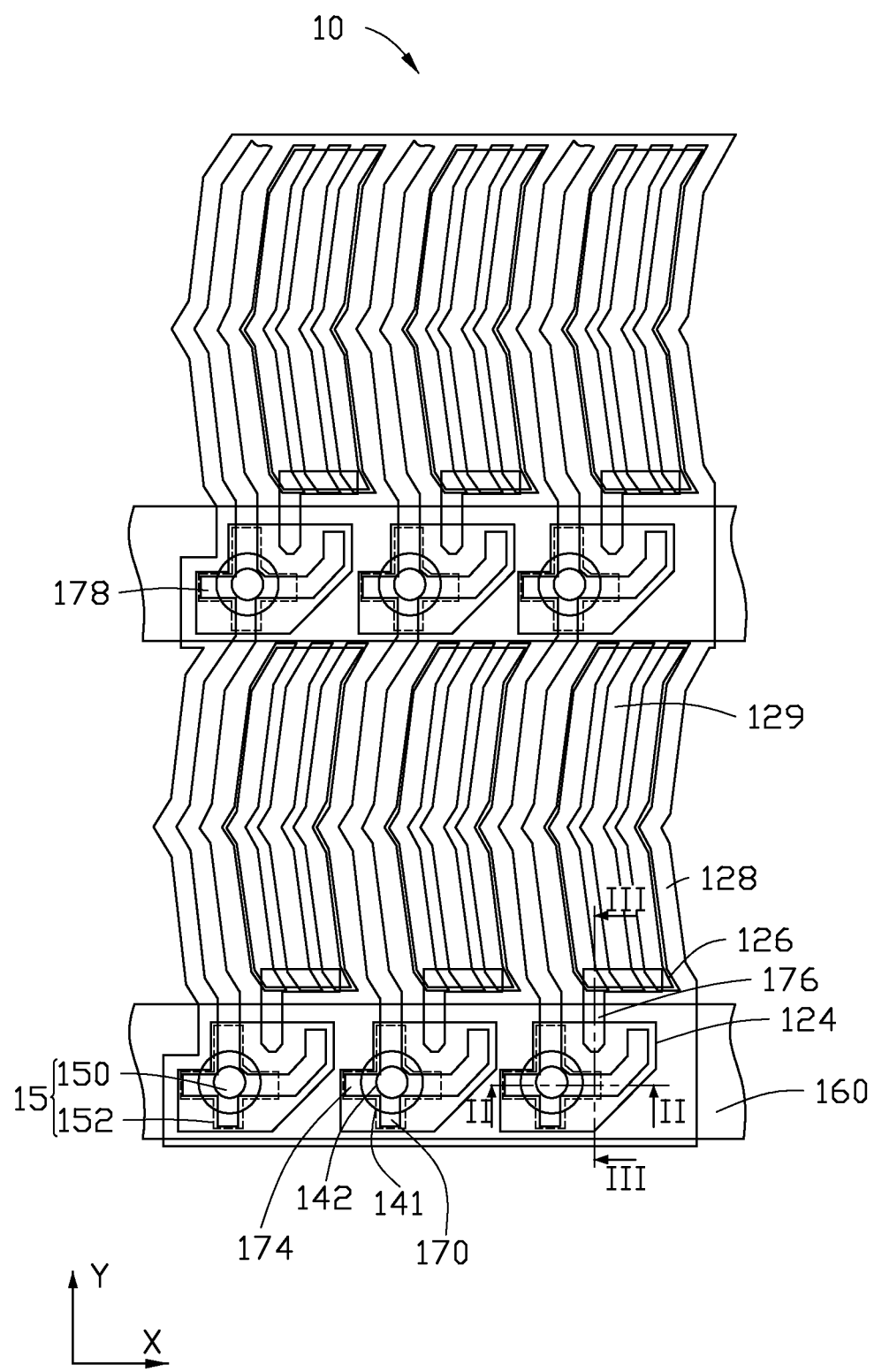
FIG. 1 is a top plan view of a liquid crystal display panel according to a first embodiment of the present disclosure.
Figure 2:
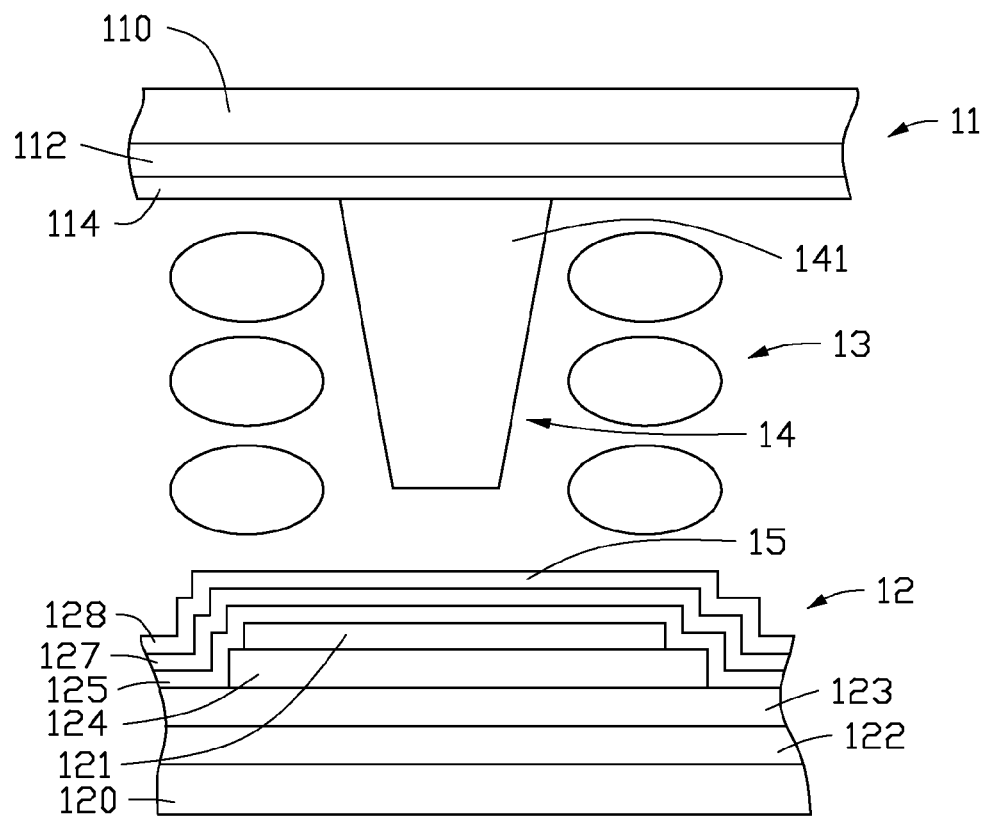
FIG. 2 is a cross-sectional view taken along II-II line of FIG. 1.
Figure 3:
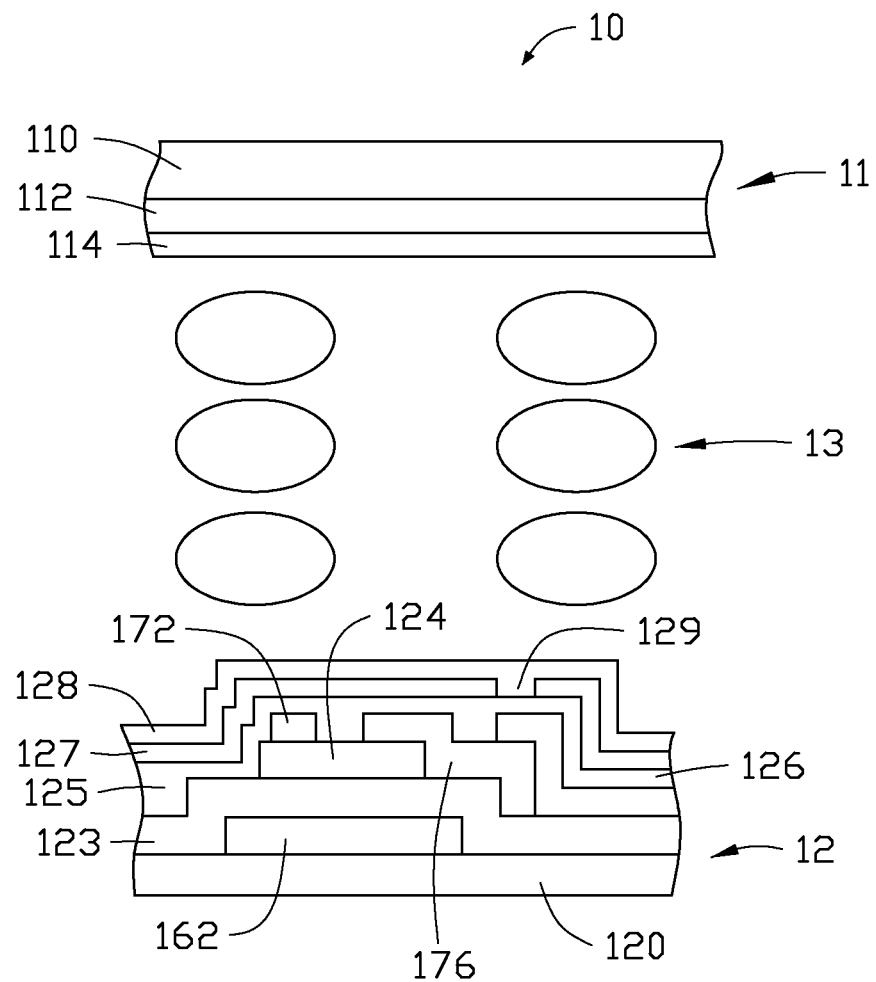
FIG. 3 is a cross-sectional view taken along III-III line of FIG. 1.

FIG. 1, FIG. 2, and FIG. 3 show a liquid crystal display panel 10 according to a first embodiment of the present disclosure. The liquid crystal display panel 10 includes a first substrate 11, a second substrate 12 facing the first substrate 11, a liquid crystal layer 13 sandwiched between the first substrate 11 and the second substrate 12, and a plurality of spacers 14 located in the liquid crystal layer 13 and protruding from the first substrate 11 towards the second substrate 12.

The first substrate 11 includes a first base plate 110, a color filter layer 112 located on a surface of the first base plate 110 adjacent to the liquid crystal layer 13, and a first alignment layer 114 located on a surface of the color filter layer 112 adjacent to the liquid crystal layer 13. The first base plate 110 can be a glass plate.

The second substrate 12 includes a second base plate 120, a first driving layer 121, a second driving layer 122, an insulation layer 123, a semiconductor layer 124, a plurality of pixel electrodes 126, a common electrode layer 127, and a second alignment layer 128. The second base plate 120 can be a glass plate.

The second driving layer 122 is formed on a surface of the second base plate 120 adjacent to the liquid crystal layer 13. The second driving layer 122 includes a plurality of gate lines 160 extending along a first direction X and a plurality of gate electrodes 162 defined at the gate lines 160. The insulation layer 123 covers a surface of the second driving layer 122 adjacent to the liquid crystal layer 13. The semiconductor layer 124 is formed on a surface of the insulation layer 123 adjacent to the liquid crystal layer 13. The first driving layer 131 is insulated from the second driving layer 122 and is formed on the semiconductor layer 124 and the insulation layer 123 adjacent to the liquid crystal layer 13. The first driving layer 121 includes a plurality of source lines 170, a plurality of source electrodes 172, a plurality of extending portions 174, and a plurality of drain electrodes 176. The source lines 170 substantially extend along a second direction Y perpendicular to the first direction X. The gate electrodes 162, the source electrodes 172, and the drain electrodes 176 define a plurality of thin film transistors each located at an intersection of the gate lines 160 and the source lines 170. The extending portion 174 and the source electrode 172 are connected to two opposite sides of the source line 170 such that the extending portion 174, the source electrode 172, and the source line 170 define a bearing portion 178 having a "+" shape.

The pixel electrodes 126 are formed on the drain electrode 176 and the insulation layer 123, and each pixel electrode 126 is connected to the corresponding one drain electrode 176. The passivation layer 125 is formed on the insulation layer 123, the semiconductor layer 124, and the first driving layer 121. The common electrode layer 127 and the second alignment layer 128 cover on the passivation layer 125 in this order. The common electrode layer 127 includes a plurality of openings corresponding to each pixel electrode 126. It can be understood, the common electrode layer 127 and the pixel electrodes 126 are located on the second substrate 12 and configured to form a plan electric field substantially parallel to the second substrate 12, such that the liquid crystal display panel 10 is an in-plan switching (IPS) liquid crystal display panel.

Because the first driving layer 121 define the bearing portions 178 having the "+" shape, the passivation layer 125, the common electrode layer 127, and the second alignment layer 128 cover the bearing portions 178 to define a plurality of supporters 15 at an inner surface of the second substrate. The plurality supporters 15 have the same shape with the bearing portion 178, that is, each supporter 15 also has a "+" shape. The plurality of supporters 15 have a plan surface facing the spacers and are configured to support the spacers 14 when an external force applied on the liquid crystal display panel 10. Each supporter 15 defines a center portion 150 and four extending portions 152 extending from the center portion 150, and each and every two adjacent extending portions 152 have an intersection angle less than or equal to 130 degrees. In this embodiment, the intersection angle between each and every two adjacent extending portions 152 is substantial 90 degrees.

The spacer 14 includes a first end 140 connected to the first substrate 11 and an opposite second end 142 adjacent to the second substrate 12. The extending portions 152 of each supporter 15 exceed a projection of the first end 140 of the corresponding one spacer 14 in the top view. In the embodiment, the extending portions 152 of each supporter 15 exceed a projection of the second end 142 of the corresponding one spacer 14 in the top view. Furthermore, the bearing portion 178 also exceeds the projection of the first end 140 and the projection of the second end 142.

The second substrate 12 defines the supporters 15 at the inner surface adjacent to the liquid crystal layer 13 for supporting the spacers 14, and because the supporters 15 have a plurality of extending portions 152, when an external force is applied on the liquid crystal display panel 10, the supporters 15 can support the spacers 14 and prevent the spacers 14 moving to other positions. Thus, the leakage of the liquid crystal display panel 10 can be reduced.

Figure 4:
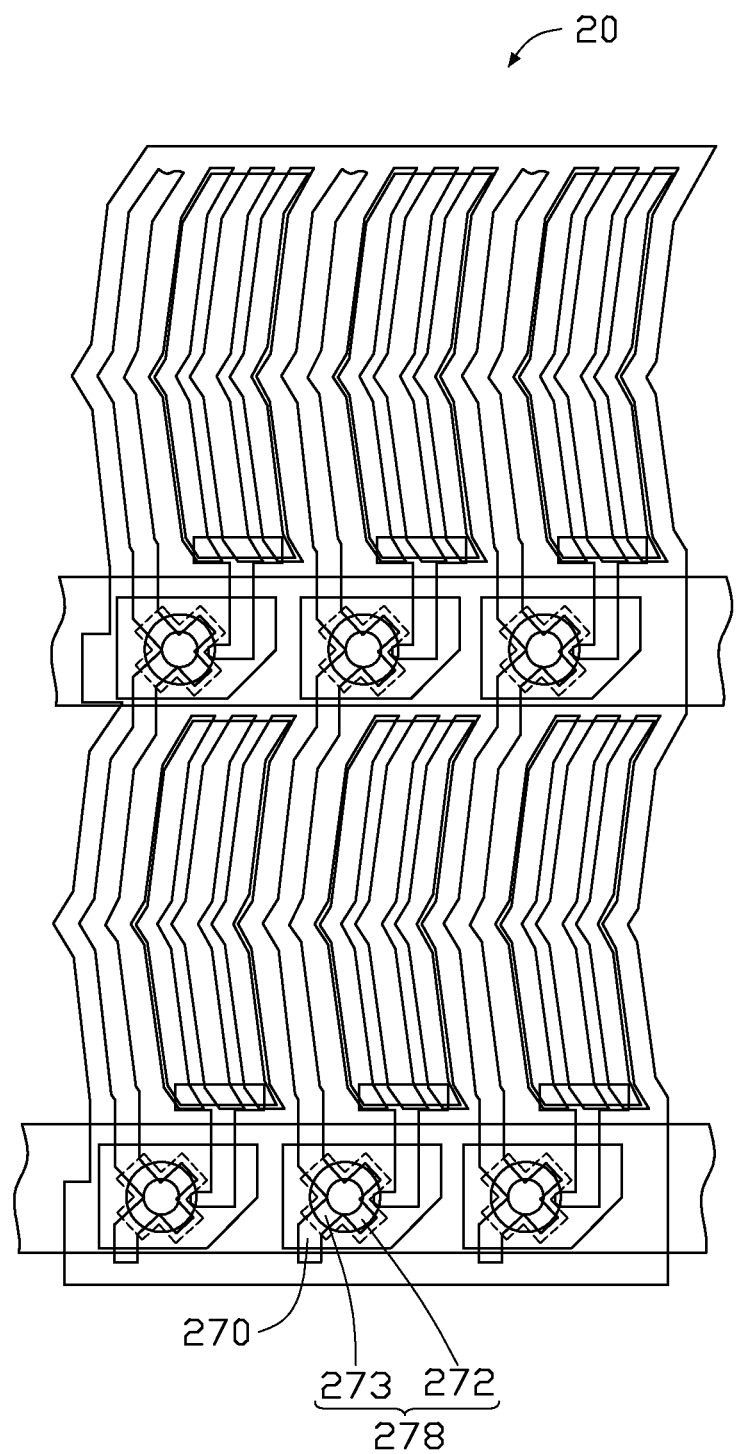
FIG. 4 is a top plan view of a liquid crystal display panel according to a second embodiment of the present disclosure.

FIG. 4 shows a top view of a liquid crystal display panel 20 according to a second embodiment of the present disclosure. The liquid crystal display panel 20 is similar with the liquid crystal display panel of the first embodiment, but differs in that: each source line 270 includes a first L-shaped part 273, the source electrode includes a second L-shaped part 272, the first L-shaped part 273 is connected to the second L-shaped part 272 to define a bearing portion 278 having a "+" shape.

Figure 5:
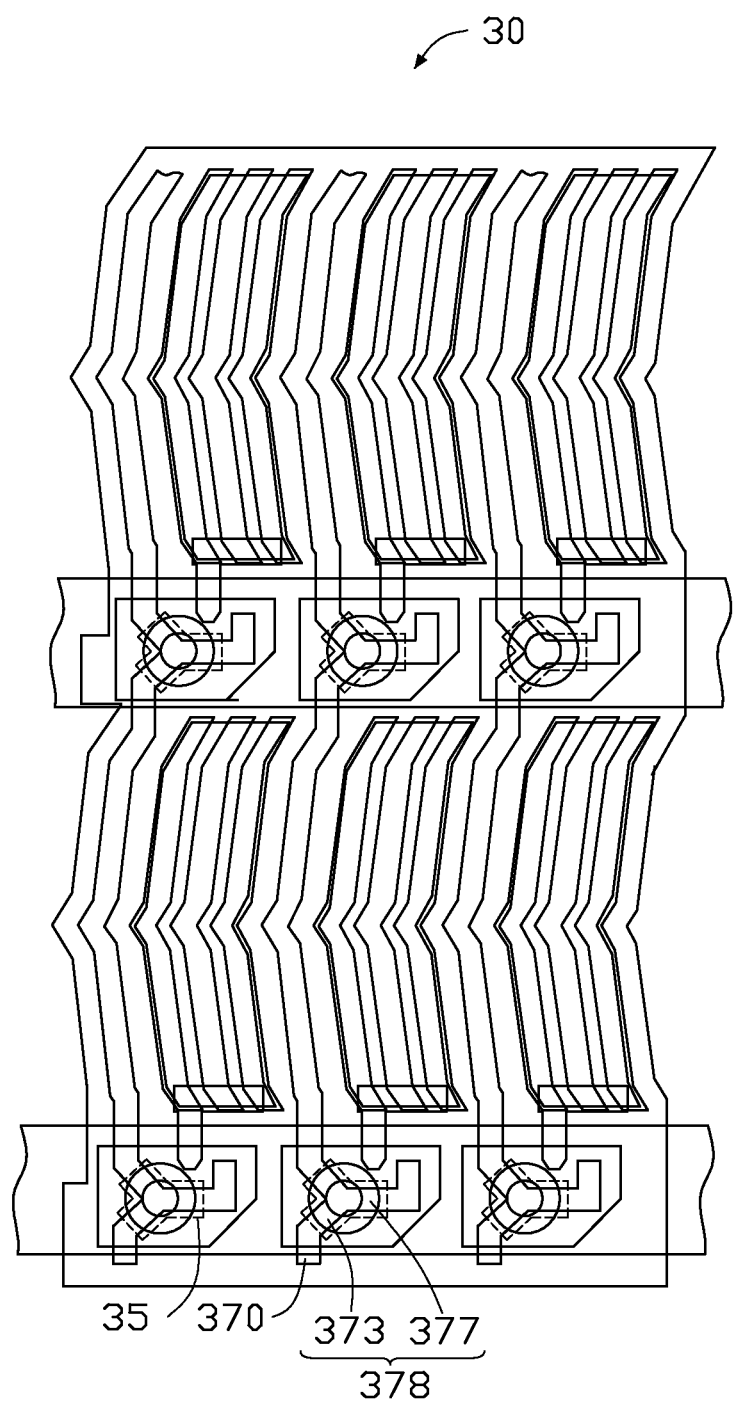
FIG. 5 is a top plan view of a liquid crystal display panel according to a third embodiment of the present disclosure.

FIG. 5 shows a top view of a liquid crystal display panel 30 according to a third embodiment of the present disclosure. The liquid crystal display panel 30 is similar to the liquid crystal display panel of the first embodiment, but differs in that: each source line 370 includes an L-shaped part 373, the source electrode includes an "I" shape part 377, the L-shaped part 373 is connected to the I-shape part 377 to form a bearing portion 378 having a "Y" shape, in order to define a Y-shaped supporter 35.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A liquid crystal display panel, comprising:
a first substrate;
a second substrate facing the first substrate;
a liquid crystal layer sandwiched between the first substrate and the second substrate;
a plurality of spacers located in the liquid crystal layer and protruding from the first substrate towards the second substrate;
a plurality of supporters defined at an inner surface of the second substrate and configured to support the spacers, each supporter corresponding to one spacer of the plurality of spacers and defining a center portion and at least three extending portions extending from the center portion in a planner view, each and every two adjacent extending portions has an intersection angle less than or equal to 130 degrees in the top view; wherein the second substrate comprises a base plate and a first driving layer located a side of the base plate adjacent to the liquid crystal layer, the first driving layer comprises a plurality of source lines, a plurality of source electrodes, a plurality of drain electrodes, and a plurality of extending portions, the source lines, the source electrodes, and the extending portions define a plurality of bearing portions corresponding to the plurality of supporters, each bearing portion has the same shape with the corresponding supporter, the plurality of spacers correspond to the bearing portions.

2. The liquid crystal display panel of claim 1, wherein each supporter comprises a plan surface facing the corresponding one spacer.

3. The liquid crystal display panel of claim 1, wherein the at least three extending portions of each supporter exceeds a projection of an end of the corresponding one spacer adjacent to the second substrate in the top view.

4. The liquid crystal display panel of claim 1, wherein the second substrate further comprises at least one cover layer located at a side of the first driving layer adjacent to the liquid crystal layer, the at least one cover layer covers the bearing portion of the first driving layer to define the plurality of supporters.

5. The liquid crystal display panel of claim 4, wherein the at least one cover layer comprises a passivation layer configured to cover thin film transistor of the liquid crystal display panel and an alignment layer located adjacent to the liquid crystal layer.

6. The liquid crystal display panel of claim 5, wherein the second substrate further comprises a second driving layer and a semiconductor layer, the second driving layer insulates from the first driving layer and the semiconductor layer, the second driving layer comprises a plurality of gate lines and a plurality of gate electrodes, the gate electrodes, the source electrodes, and the drain electrodes define a plurality of thin film transistors.

7. The liquid crystal display panel of claim 6, wherein the extending portion and the source electrode are connected with two different sides of the source line such that the extending portion, the source electrode, and the source line define the bearing portion having a "+" shape.

8. The liquid crystal display panel of claim 6, wherein the source line comprises a first L-shaped part, the source electrode comprises a second L-shaped part, the first L-shaped part is connected to the second L-shaped part to define the bearing portion having a "+" shape.

9. The liquid crystal display panel of claim 6, wherein the source line comprises an L-shaped part, the source electrode comprises an I-shaped part connected to the L-shaped part, and the L-shaped part and the I-shaped part define the bearing portion having a "Y" shape.

10. A liquid crystal display panel, comprising:
a first substrate;
a second substrate facing the first substrate;
a liquid crystal layer sandwiched between the first substrate and the second substrate;
a plurality of spacers located in the liquid crystal layer and protruding from the first substrate towards the second substrate;
a plurality of supporters defined at an inner surface of the second substrate and configured to support the spacers, each supporter corresponding to one spacer of the plurality of spacers, and each supporter having one shape selected from a group consisting of the "+" shape and the "Y" shape in a top view; wherein the second substrate comprises a base plate and a first driving layer located a side of the base plate adjacent to the liquid crystal layer, the first driving layer comprises a plurality of source lines, a plurality of source electrodes, a plurality of drain electrodes, and a plurality of extending portions, the source lines, the source electrodes, and the extending portions define a plurality of bearing portions corresponding to the plurality of supporters, each bearing portion has the same shape with the corresponding supporter, the plurality of spacers correspond to the bearing portions.

11. The liquid crystal display panel of claim 10, wherein each supporter comprises a plan surface facing the corresponding one spacer and configured to support the spacer when an external force applied on the liquid crystal panel.

12. The liquid crystal display panel of claim 10, wherein each supporter exceeds a projection of an end of the corresponding one spacer adjacent to the second substrate in the top view.

13. The liquid crystal display panel of claim 10, wherein the second substrate further comprises at least one cover layer located at a side of the first driving layer adjacent to the liquid crystal layer, the at least one cover layer covers the bearing portion of the first driving layer to define the plurality of supporters.

14. The liquid crystal display panel of claim 13, wherein the at least one cover layer comprises a passivation layer configured to cover thin film transistor of the liquid crystal display panel and an alignment layer located adjacent to the liquid crystal layer.

15. The liquid crystal display panel of claim 14, wherein the second substrate further comprises a second driving layer and a semiconductor layer, the second driving layer insulates from the first driving layer and the semiconductor layer, the second driving layer comprises a plurality of gate lines and a plurality of gate electrodes, the gate electrodes, the source electrodes, and the drain electrodes define a plurality of thin film transistors.

16. The liquid crystal display panel of claim 15, wherein the extending portion and the source electrode are connected with two different sides of the source line such that the extending portion, the source electrode, and the source line define the bearing portion having a "+" shape.

17. The liquid crystal display panel of claim 15, wherein the source line comprises a first L-shaped part, the source electrode comprises a second L-shaped part, the first L-shaped part is connected to the second L-shaped part to define the bearing portion having a "+" shape.

18. The liquid crystal display panel of claim 15, wherein the source line comprises an L-shaped part, the source electrode comprises an I-shaped part connected to the L-shaped part, and the L-shaped part and the I-shaped part define the bearing portion having a "Y" shape.

* * * * *